US010838888B2

(12) United States Patent
Murata et al.

(10) Patent No.: US 10,838,888 B2
(45) Date of Patent: Nov. 17, 2020

(54) ELECTRONIC CONTROL UNIT FOR TRANSMITTING DIAGNOSTIC DATA WITHOUT INCREASING A DATA TRANSMISSION AMOUNT

(71) Applicant: DENSO CORPORATION, Kariya (JP)

(72) Inventors: Yuya Murata, Kariya (JP); Hirokazu Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 81 days.

(21) Appl. No.: 16/048,498

(22) Filed: Jul. 30, 2018

(65) Prior Publication Data
US 2019/0050354 A1 Feb. 14, 2019

(30) Foreign Application Priority Data
Aug. 10, 2017 (JP) .................................. 2017-155487

(51) Int. Cl.
*H04L 12/801* (2013.01)
*G07C 5/00* (2006.01)
*G06F 13/20* (2006.01)
*G07C 5/08* (2006.01)

(52) U.S. Cl.
CPC ............. *G06F 13/20* (2013.01); *G07C 5/008* (2013.01); *G07C 5/085* (2013.01); *G07C 5/0808* (2013.01); *G07C 2205/02* (2013.01)

(58) Field of Classification Search
CPC .................................. H04L 47/10; G07C 5/00
See application file for complete search history.

(56) References Cited

U.S. PATENT DOCUMENTS

| 10,431,015 | B2* | 10/2019 | Uno ........................ H04Q 9/00 |
| 2013/0015982 | A1 | 1/2013 | Matsumoto et al. |
| 2013/0317692 | A1* | 11/2013 | Iga ......................... G07C 5/008 |
| | | | 701/31.4 |
| 2014/0122815 | A1* | 5/2014 | Iwakoshi ............ G06F 13/1626 |
| | | | 711/158 |
| 2017/0339056 | A1* | 11/2017 | Uno ....................... G07C 5/008 |
| 2017/0352261 | A1* | 12/2017 | Hasegawa ............ G08G 1/0112 |

* cited by examiner

*Primary Examiner* — David E Martinez
(74) *Attorney, Agent, or Firm* — Posz Law Group, PLC

(57) ABSTRACT

An electronic control unit (ECU) is disposed in a vehicle, and includes an input section and a controller. The input section inputs vehicle data from vehicle sensors and actuator to the controller. The controller includes a priority setter and a transmission data generator. The transmission data generator transmits transmission object data, which is data for transmission to an external device and generated from the vehicle data. The priority setter sets priority of the transmission object data based on priority setting data, which is data included in the vehicle data. The transmission data generator performs an adjustment process for adjusting an amount of transmission data based on the priority. The ECU provides an efficient transmission of data by limiting and/or preventing an increase in the amount of transmission data.

15 Claims, 5 Drawing Sheets

FIG. 4

<NORMAL TRANS. MODE (SAME PRIORITY FOR ALL)>

| A | B | C | D | E | A | B | C | D | E | | | | | |

FIG. 5

<PRIORITY TRANS. MODE (ENTIRE DATA LENGTH ≤ TRANS. BUFFER SIZE)>

| A | A | B | C | D | E | A | A | B | C | D | E | | | |

FIG. 6

<PRIORITY TRANS. MODE (ENTIRE DATA LENGTH > TRANS. BUFFER SIZE)>

| A | A | B | B | C | D | D | E | A | A | B | B | C | D | D | E |

⇩ IMPORTANCE-BASED DATA ADJUSTMENT
(READJUSTMENT PROCESS)

| A | A | B | B | C | D | D | E | A | A | B | B | C | D | D |

FIG. 7

<PRIORITY TRANS. MODE (ENTIRE DATA LENGTH > TRANS. BUFFER SIZE)>

| A | A | B | B | C | C | D | D | E | A | A | B | B | C | C | D | D | E |

⇩ IMPORTANCE-BASED DATA ADJUSTMENT
(READJUSTMENT PROCESS)

| A | A | B | B | C | C | D | D | E | A | A | B | B | C | C | D | D |

⇩ KEEP TIME-BASED DATA ADJUSTMENT
(READJUSTMENT PROCESS)

| A | B | B | C | C | D | D | E | A | B | B | C | C | D | D |

FIG. 8

<PRIORITY TRANS. MODE (ENTIRE DATA LENGTH > TRANS. BUFFER SIZE)>

| A | A | B | B | C | C | D | D | E | A | A | B | B | C | C | D | D | E |

⇩ IMPORTANCE-BASED DATA ADJUSTMENT
(READJUSTMENT PROCESS)

| A | A | B | B | C | C | D | D | E | A | A | B | B | C | C | D | D |

⇩ WEIGHT-BASED DATA ADJUSTMENT
(READJUSTMENT PROCESS)

| A | B | C | D | A | B | C | D | E | A | B | C | D | | |

ELECTRONIC CONTROL UNIT FOR TRANSMITTING DIAGNOSTIC DATA WITHOUT INCREASING A DATA TRANSMISSION AMOUNT

CROSS REFERENCE TO RELATED APPLICATION

The present application is based on and claims the benefit of priority of Japanese Patent Application No. 2017-155487, filed on Aug. 10, 2017, the disclosure of which is incorporated herein by reference.

TECHNICAL FIELD

The present disclosure generally relates to an electronic control unit disposed in a vehicle.

BACKGROUND INFORMATION

Conventionally, an electronic control unit disposed in a vehicle is configured to collect diagnostic data (e.g., failure data) of the vehicle at a preset interval. Further, the electronic control unit typically saves the collected data in memory once the collected data is confirmed as abnormality/diagnostic information (i.e., failure data). The vehicle may then be brought to a dealership or a repair shop, where the abnormality information can be transmitted from the electronic control unit to an external device for further analysis of the diagnostic data/abnormality information to assist in the repair of the vehicle.

In the configuration described above, for a more-precise analysis of the failure caused in the vehicle, collecting more data may be required. In an era of "big data", the failure-related data can now be transmitted from the electronic control unit in the vehicle to the external device in real time. Japanese Patent No. 2016-119547 discloses an example of such a data transmission scheme.

However, data transmission at a preset interval with a blind increase in the data communication amount from the electronic control unit to the external device may simply increase the transmission of wasteful data. That is, such transmission may put a heavier load on the communication channel and may flood the external device with wasteful data that is not required for the data analysis.

SUMMARY

It is an object of the present disclosure to provide an electronic control unit that is capable of efficiently transmitting diagnostic data without flooding the communication channel and/or the external device, that is, without increasing the data transmission amount.

In an aspect of the present disclosure, an electronic control unit disposed in a vehicle may include: an input section, a transmission data generator, and a priority setter. The input section may be configured to input vehicle data from vehicle sensors and actuators as transmission object data. The transmission data generator may be configured to transmit the transmission object data from the electronic control unit to an external device as transmission data. The priority setter may be configured to set a priority of the transmission object data based on priority setting data in the vehicle data for data transmission. The transmission data generator may be further configured to perform an adjustment process for adjusting an amount of transmission data transmitted by the transmission data generator based on the priority set by the priority setter.

According to the configuration described above, data transmission to the external device under control of the electronic control unit of the present disclosure may be limited or prevented from blindly transmitting all data by decreasing the data amount and reducing the load of the communication channel. Further, by performing the adjustment process for adjusting the data amount of the transmission data based on the priority, waste data not required for an analysis by the external device will not be transmitted. Therefore, the electronic control unit configured in the above-described manner achieves an efficient transmission of diagnostic vehicle data without increasing the amount of transmission data.

BRIEF DESCRIPTION OF THE DRAWINGS

Objects, features, and advantages of the present disclosure will become more apparent from the following detailed description made with reference to the accompanying drawings, in which:

FIG. 4 illustrates a state of a transmission buffer in a normal transmission mode in the first embodiment of the present disclosure;

FIG. 5 illustrates a state of the transmission buffer in a priority transmission mode in the first embodiment of the present disclosure;

FIG. 6 illustrates another state of the transmission buffer in the priority transmission mode in the first embodiment of the present disclosure;

FIG. 7 illustrates a state of the transmission buffer in a priority transmission mode in a second embodiment of the present disclosure; and FIG. 8 illustrates a state of the transmission buffer in a priority transmission mode in a third embodiment of the present disclosure.

DETAILED DESCRIPTION

Hereafter, with reference to the drawings, embodiments of the present disclosure are respectively described. In each of the following embodiments, the same numerals are assigned to like elements and features of the different embodiments.

First Embodiment

Hereafter, the first embodiment of the present disclosure is described with reference to FIGS. 1-6.

Figure 1:
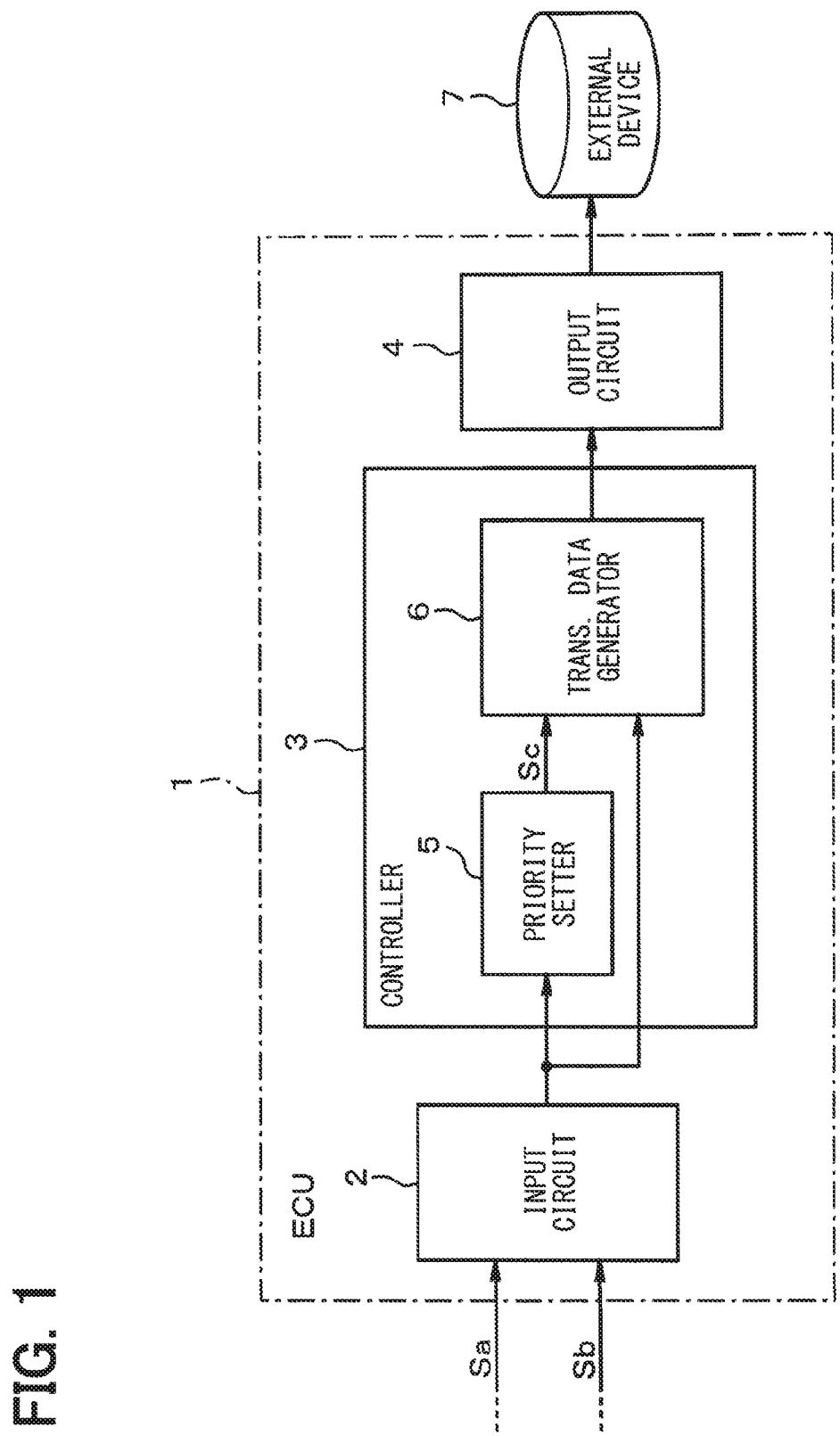
FIG. 1 is a block diagram of an electronic control unit and peripheral devices in a first embodiment of the present disclosure.

With reference to FIG. 1, an electronic control unit (ECU) 1 is disposed in a vehicle (not shown), and may include an input circuit 2, a controller 3, and an output circuit 4. A signal Sa may be input into the ECU 1 that includes information on the vehicle and is output by various kinds of actuators disposed in the vehicle. A signal Sb may also be input to the ECU 1 that includes information for a control state of the vehicle from various kinds of sensors disposed in the vehicle.

Both the signals Sa and Sb are signals that include vehicle data, which is data/information about the vehicle, and are input to the ECU 1 via the input circuit 2. That is, the ECU 1 is configured to receive inputs of the vehicle data via the input circuit 2. Thus, in the present embodiment, the input circuit 2 corresponds to an input section which inputs the vehicle data.

The controller 3 may be a microcomputer containing a CPU, ROM, RAM, and the like, together with other components. The controller 3 includes a priority setter 5 and a transmission data generator 6. Both the priority setter 5 and the transmission data generator 6 may be realized by software. That is, the priority setter 5 and the transmission data generator 6 may be implemented when the CPU of the controller 3 executes a program stored in the ROM to respectively perform a priority setting function and a transmission data generation function. Alternatively, the priority setter 5 and the transmission data generator 6 may also be realized by hardware. That is, the priority setter 5 and the transmission data generator 6 may be specific circuits for respectively performing priority setting functions and transmission data generation functions. For example, the priority setter 5 and the transmission data generator 6 may be application-specific integrated circuits (ASICs), Field-programmable gate arrays (FPGAs), and like hardware circuits respectively configured to perform a priority setting function and a transmission data generation function.

The priority setter 5 sets a priority of data that serves as a transmission object transmitted to an external device 7. The data transmitted to the external device 7 may be the vehicle data input via the input circuit 2. The data serving as a transmission object may be referred to as "transmission object data." The external device 7 is a device external to the ECU 1, e.g., a server of a data center that collects and manages varieties of information, such as vehicle operating information. The external device 7 performs various kinds of analyses using transmission data transmitted from the ECU 1. In the present embodiment, transmission object data is data corresponding to the signals Sa and Sb that are output from the sensors and the actuators to be analyzed by the external device 7. As used herein, "transmission object data" may refer to data being processed by the ECU 1 for transmission to the external device 7, that is, data prior to transmission. "Transmission data," on the other hand, may refer to data transmitted from the ECU 1 via an output circuit 4 to the external device.

The priority is set by the priority setter 5 based on predetermined setting data in the vehicle data. As for the setting data, various kinds of information such as the hardware information regarding (i) the travel distance of the vehicle, and (ii) the number of drive times of various devices in the vehicle, as well as aging (e.g., the age of the various devices) and the like, may be considered. The setting data may also include environment information of the vehicle environment, for example, outside air temperature, atmospheric pressure and the like. The setting data may further include vehicle state information, which represents various kinds of vehicle states.

A priority is set for each piece of transmission object data. Further, the setting condition of the priority is predefined for each piece of vehicle data. That is, the setting data to be used for setting priority based on conditions may be defined for each of the target sensors and target actuators. The priority setter 5 outputs a signal Sc that includes the set priority to the transmission data generator 6.

The transmission data generator 6 samples and obtains the transmission object data at a predetermined sampling cycle from the vehicle data input via the input circuit 2. In such manner, the transmission object data obtained by the transmission data generator 6 is updated to the latest data at every sampling cycle. The sampling cycle may also be referred to as a "data acquisition interval" or a "sampling rate."

The transmission data generator 6 generates the transmission data from the obtained transmission object data, and transmits the generated data to the external device 7 via the output circuit 4. As such, the transmission data generator 6 corresponds to a transmitter, which transmits the transmission object data to an external device. In the present embodiment, data transmission from the ECU 1 to the external device 7 is performed by wireless communications. Therefore, the output circuit 4 may be configured as a communication interface for performing wireless communications.

The transmission data generator 6 also functions as a data adjuster. That is, in generating the transmission data, the transmission data generator 6 performs an adjustment process that adjusts an amount of data in the transmission data. The data amount may also be referred to as a "data number," "a data length," and "a data size." The above-described adjustment process is performed based on the priority set by the signal Sc, that is, based on the priority set by the priority setter 5.

In the adjustment process of the present embodiment, the amount of transmission data is adjusted by adjusting the data acquisition interval, that is, the update frequency of the transmission object data according to priority. In such case, the data acquisition interval of the transmission object data is adjusted so that the interval becomes shorter for data with a higher priority, or the interval becomes longer for data with a lower priority.

The transmission data generator 6 includes a transmission buffer that stores the obtained transmission object data. The transmission data generator 6 transmits the transmission object data stored in the transmission buffer as the transmission data at every predetermined transmission cycle to the external device 7 via the output circuit 4. In the present embodiment, the adjustment process is performed at every transmission cycle of the transmission data.

The transmission data generator 6 may perform a readjustment process that adjusts the data amount of the transmission data based on priority and a readjustment parameter, when the amount of transmission data generated after performing the adjustment process exceeds a predetermined maximum capacity. The above-described maximum capacity is defined according to the capacity of the transmission buffer in the transmission data generator 6, which, in the present embodiment, is set as the capacity of the transmission buffer.

In the present embodiment, an importance level may be set for the vehicle data used as a transmission object, that is, the vehicle data generated by the sensors and actuators. The above-described importance level may be used as a readjustment parameter in the readjustment process.

Next, the operational effects of the above-described configuration are described.

<Process Performed by the Priority Setter 5>

The process performed by the priority setter 5 is described with reference to FIG. 2. In Step S101, the priority setter 5 obtains predefined setting data for the transmission object data. In Step S102, the priority setter 5 determines based on the obtained setting data whether to change the priority for the transmission object data.

When the priority setter 5 determines that a priority change is required, the process branches to "YES" in Step S102, and the process proceeds to Step S103. The priority of the corresponding transmission object data is changed in Step S103. When the priority setter 5 determines that a change of priority is not required, the process branches to "NO" in Step S102, and the process finishes without changing priority of the relevant transmission object data, that is, without performing Step S103.

The following examples describe a change in priority of the setting data based on certain hardware information. The priority of data of an automatic transmission (AT), e.g., an AT linear solenoid, may be raised when a specification value corresponding to the lifetime of the AT is exceeded. The priority of transmission-related data may be raised when a travel distance exceeds an upper limit value. The priority of data relevant to a certain piece of vehicle hardware may be raised when the number of drive times (e.g., a vehicle trip count from an ignition ON state to an ignition OFF state) exceeds a fixed count for such hardware.

The following examples describe a change in priority of the setting data based on environment information. The priority of cold start solenoid (CSS) related data, i.e., cold start related data, may be elevated when the current position of the vehicle is determined to be in a cold area based on the air temperature outside the vehicle. The priority of data influenced by an atmospheric pressure may be raised when the current position of the vehicle is determined as a high altitude area based on the atmospheric pressure.

The following examples describe a change in priority of the setting data based on vehicle state information. The priority of data for a control state may be raised when the control state of the vehicle departs from a normal state (e.g., when the difference between the current control state of the vehicle and the normal control state of the vehicle is large or exceeds a certain threshold value). The priority of data demonstrating the effect of an emissions reduction technique may be elevated when data for an emissions reduction technique is requested. The priority of data for off-cycle technology (e.g., off-cycle credits (e.g., carbon offset credits) for pollution reduction technology) may be elevated when an off-cycle technology device for reducing emissions is operating.

<Process Performed by the Transmission Data Generator 6>

The process performed by the transmission data generator 6 is described with reference to FIG. 3. In Step S201, the transmission data generator 6 obtains the priority for the transmission object data based on the signal Sc output from the priority setter 5. In Step S202, the transmission object data is obtained at the data acquisition interval based on the priority obtained in Step S201. That is, in Step S202, the transmission data generator 6 performs both (i) an acquisition process of the transmission object data, and (ii) an adjustment process where the amount of transmission data is adjusted by adjusting the data acquisition interval based on priority.

In Step S203, the transmission data generator 6 determines whether an entire data length, which is the sum total of the data length of all the obtained transmission object data, is equal to or smaller than the maximum capacity, that is, the value set as the capacity of the transmission buffer. When the transmission data generator 6 determines the entire data length is equal to or less than the maximum capacity, i.e., "YES" in Step S203, the process proceeds to Step S204.

On the other hand, when the transmission data generator 6 determines the entire data length exceeds the maximum capacity, i.e., "NO" in Step S203, the process proceeds to Step S205. In Step S205, the transmission data generator 6 performs the readjustment process where the amount of transmission data is adjusted based on the priority and the readjustment parameter. After performing Step S205, the process proceeds to Step S204. In Step S204, the transmission data generator 6 generates the transmission data from the obtained transmission object data. In Step S206, the transmission data generator 6 transmits the transmission data generated in Step S204 to the external device 7 via the output circuit 4.

<An Example of the Adjustment Process and the Re-Adjustment Process Based on Priority>

In the following example, it is assumed that the transmission object data is the data corresponding to each of the signals Sa that are output from five sensors A to E. In such case, the importance level for each of the sensors A to E is set as "A>B>C>D>E," where the importance level of the sensor A is the highest (e.g., the importance of A is greater than the importance of B, C, D, and E) and the importance level of the sensor E is the lowest.

The transmission cycle of the transmission data is assumed to be "1000 ms (milliseconds)," and the data size for each piece of the transmission object data that is obtained at one time is assumed to be "2 bytes." The data acquisition interval of the transmission object data when the priority is not changed is assumed to be "500 ms." In the above-described configuration, the capacity of the transmission buffer, i.e., the size of the buffer, is reserved as a sufficient size with a margin for the entire data length of the data transmitted in the normal transmission mode. More practically, the maximum value of the size of the transmission buffer, which is the data size transmittable at one time, i.e., at every transmission cycle, is assumed to be "30 bytes."

(3-1) Normal Transmission Mode

The normal transmission mode assumes that there is no change of priority in the transmission object data. Therefore, in the normal transmission mode, the priority is the same for all of the data, i.e., for all of the transmission object data corresponding to the sensors A to E, and the data acquisition interval is "500 ms." In such case, the transmission object data corresponding to each of the sensors A to E is stored in the transmission buffer based on the order of acquisition.

More practically, as shown in FIG. 4, the transmission object data for two cycles is stored in an order of the sensors A to E. As a result, "20 bytes" (e.g., 10 pieces of 2 byte data) within the limit of 30 bytes which is reserved in the transmission buffer is used in the normal transmission mode. That is, in the normal transmission mode, the entire data length is well within, i.e. equal to or smaller than, the maximum capacity, and the readjustment process is not performed.

(3-2) Elevation of Sensor a Priority (e.g., Entire Data Length Maximum Capacity)

When the priority of the sensor A is changed, that is, elevated to a higher priority level (shown as PRIORITY TRANSMISSION MODE in FIG. 5), the data acquisition interval for the transmission object data corresponding to the sensor A is changed to "250 ms." As a result, as shown in FIG. 5, the size of the transmission object data corresponding to the sensor A is set as "8 bytes," (e.g., as four pieces of 2 byte data) and the entire data length is "24 bytes." However, even in such case, the entire data length is equal to or smaller than the maximum capacity, and the readjustment process is not performed.

(3-3) Elevation of Sensor A, B, and D Priority (e.g., Entire Data Length> Maximum Capacity)

When the priority of the sensors A, B, and D is raised, the data acquisition interval of the transmission object data corresponding to the sensors A, B, and D is changed to "250 ms." As a result, as shown in an upper part of FIG. 6, the size of the transmission object data corresponding to the sensors A, B, and D are each set as "8 bytes," and the entire data length totals "32 bytes." In such case, since the entire data length exceeds the maximum capacity of 30 bytes, the readjustment process is performed.

In the readjustment process, the data acquisition interval is changed to a longer period in an ascending order of data importance, in order to fit the entire data length within the maximum capacity. In other words, data having the lowest importance level is set to have a longer data acquisition internal. In such a case, the data acquisition interval of the transmission object data corresponding to the sensor E, which has the lowest importance level, is changed to "1000 ms." As a result, as shown in a lower part of FIG. 6, the total size of the transmission object data corresponding to the sensor E is set to be "2 bytes," and the entire data length now fits within the reserved "30 bytes." As such, the readjustment process ends at such point, without changing the data acquisition intervals of the other transmission object data.

Figure 3:
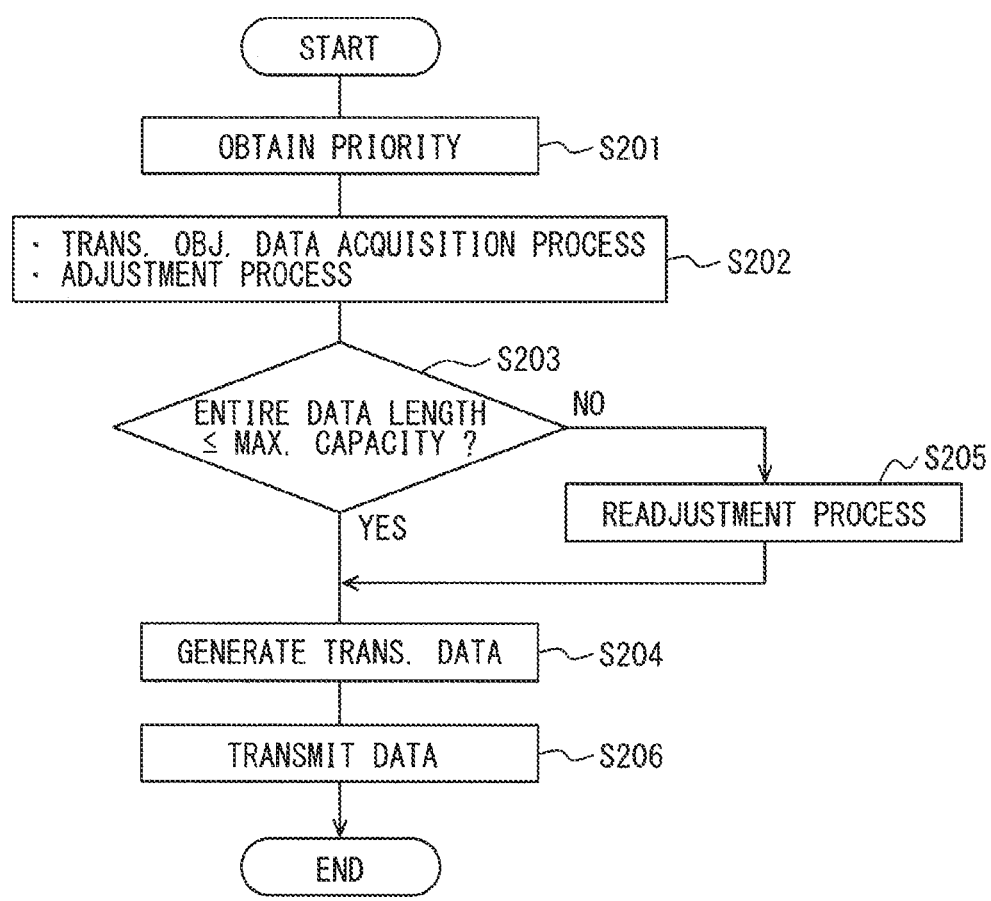
FIG. 3 is a flowchart of a process of a transmission data generator in the first embodiment of the present disclosure.

However, in other cases where a further reduction to the entire data length may be needed, the processes at S203 and S205 in FIG. 3 may be repeated to further reduce the entire data length.

In the present embodiment described above, the following effects are achievable.

In the present embodiment, the priority of the transmission object data is set based on the setting data, e.g., based on the hardware information, the environment information, the vehicle state information, and the amount of transmission data is adjusted based on such priority. Such manner of data transmission limits and/or prevents the blind transmission of all the data in every cycle, the data communication amount is reduced, and the load on a server or communication line is reduced. Further, in the above-described configuration, wasteful diagnostic data not required for analysis by the external device is limited and/or prevented from being transmitted to the external device. Therefore, the effects of efficient data transmission while limiting and/or preventing an increase in the amount of data to be transmitted are achieved by the ECU 1 of the present embodiment. Therefore, the external device 7 can efficiently collect required diagnostic data, while limiting and/or preventing an increase in the data communication amount.

Since each of the above-described various types of information used for the setting of priority may change from time to time, the priority of the transmission object data may also change accordingly. Thus, in the present embodiment, the adjustment process is configured to be performed at every transmission cycle of transmitting data. In such manner, the above-described effects are maximized due to the ability of the present embodiment to quickly reflect changes in various types of information used to set the priority and to adjust the amount of transmission data.

In the adjustment process of the present embodiment, the data amount is adjusted by adjusting the update frequency of the transmission object data based on the priority. More specifically, for transmission object data with a higher priority, the update frequency becomes more frequent. Likewise, transmission object data with a lower priority is updated less frequently. In the present embodiment, the priority reflects necessity of, or demand for, the data by the external device 7, that is, the transmission destination of the data.

Therefore, according to the above-described configuration, the data with a higher necessity, as reflected by the demands of the external device 7, may be obtained with a high sampling rate, and the data with a lower necessity may be obtained with a relatively-low sampling rate. Therefore, according to the above-described configuration, the present embodiment can limit and/or prevent both (i) an increase in the amount of wasted communication data, and (ii) storing large amounts of wasted communication data in the external device 7, while maintaining a high level of analysis accuracy by the external device 7.

In the present embodiment, the priority setting condition by the priority setter 5 is defined for each type of vehicle data. Therefore, according to the present embodiment, the conditions for changing priority of the data output from various sensors and actuators disposed in the vehicle may be changeable from sensor to sensor and/or from actuator to actuator. That is, the priority may be individually set for each of the sensors and/or actuators.

The transmission data generator 6 is configured to perform the readjustment process that adjusts the data amount after performing the adjustment process based on the priority and the readjustment parameter when the amount of transmission data exceeds the maximum capacity. In such manner, even when the amount of transmission data exceeds the maximum capacity defined according to the capacity of the transmission buffer, as a result of performing the adjustment process based on priority, the readjustment process can change the amount of the transmission data to be within the maximum capacity, thereby limiting and/or preventing an excess data communication amount. That is, the readjustment process can readjust the amount of transmission data to be within the maximum capacity of the buffer, even when the adjustment process causes the transmission data to exceed the maximum capacity.

Further, in the present embodiment, the importance level of the sensor and the actuator corresponding to the vehicle data (i.e., transmission object) is used as the readjustment parameter. In such manner, in the readjustment process, the update frequency of the data with a high importance may be maintained at a high level, while the update frequency of low importance data may be changed/adjusted to a low level. In the present embodiment, the importance level reflects, just like the priority, the necessity of the data by the external device 7, i.e., the transmission destination of the data. Therefore, according to the above-described configuration, the present embodiment limits and/or prevents both an increase in wasteful data communication, and large amounts of wasteful data storage by the external device 7, while maintaining a high level of analysis accuracy by the external device 7.

Second Embodiment

Hereafter, the second embodiment of the present disclosure is described with reference to FIGS. 1 and 7. According to the second embodiment, the readjustment process is different from the first embodiment. The second embodiment uses the same reference numerals for the same elements and features described with reference to the first embodiment. The description of like elements and features between the embodiments is omitted for brevity.

In the present embodiment, the priority setter 5 shown in FIG. 1 may perform processing that measures a "keep time" during which an elevated priority state is maintained, that is, when the priority is raised for predetermined transmission object data. In other words, the priority setter 5 may measure the amount of time (i.e., keep time) a piece of transmission object data remains in an elevated priority state. Further, in the present embodiment, the keep time is used as a readjustment parameter in addition to the above-described importance level for the readjustment process.

Figure 2:
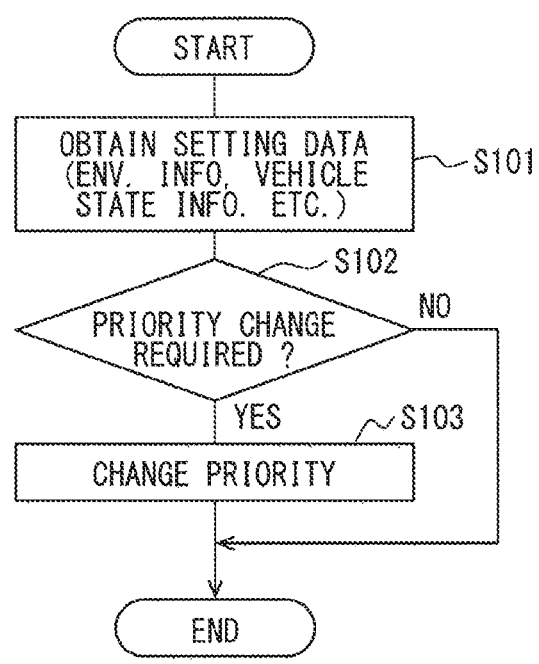
FIG. 2 is a flowchart of a process of a priority setter in the first embodiment of the present disclosure.

For example, with reference to FIG. 2, the priority setting process may be slightly modified to include additional processes after S103 where the priority setter 5 measures a "keep time" for a transmission data object, that is, the amount of time an elevated priority state is maintained for the transmission data object.

With reference to FIG. 7, an example of the readjustment process in the present embodiment is described. When the priority is raised for the sensors A, B, C and D, the data acquisition interval of the transmission object data corresponding to the sensors A, B, C and D is changed to "250 ms." As a result, as shown in the upper part of FIG. 7, the size of the transmission object data corresponding to each of the sensors A, B, C and D is set to "8 bytes," and the entire data length becomes "36 bytes." In such a case, since the entire data length exceeds the maximum capacity, the readjustment process using the importance level as a readjustment parameter is performed first.

In the readjustment process using the importance level, the data acquisition interval of the transmission object data corresponding to the sensor E, which has with the lowest importance level, is changed to "1000 ms." As a result, as shown in a middle part of FIG. 7, the size of the transmission object data corresponding to the sensor E is set to "2 bytes." However, even with the reduction of the object data corresponding to sensor E to 2 bytes, the entire data length is "34 bytes" and still exceeds the reserved capacity of 30 bytes. Thus, the transmission data generator 6, as shown in FIG. 1, may perform the readjustment process using the keep time as a readjustment parameter.

In this example, the keep time of the sensor A is assumed to be of the longest duration among the sensors A, B, C and D. Based on such an assumption, when the readjustment process uses the keep time as a readjustment parameter, the data acquisition interval of the transmission object data corresponding to the sensor A with the longest keep time is changed to "500 ms." As a result, as shown in a lower part of FIG. 7, the size of the transmission object data corresponding to the sensor A is set to "4 bytes," which enables the entire data length to fit into the reserved capacity of "30 bytes." As such, the readjustment process is ended, without changing the data acquisition intervals of the other transmission object data.

With reference to the readjustment process performed by the transmission data generator 6 in FIG. 3 at S205, the process may be slightly modified. For example, the transmission data generator 6 may perform the readjustment process based on the importance level and keep time as one process, while in another example, the transmission data generator 6 may perform the readjustment process piecewise, that is, performing the readjustment based on importance level first and then performing the readjustment based on the keep time. As such, the processes S203 and S205 in FIG. 3 may be repeated as needed to reduce an entire data length to or below the maximum capacity.

As described above, in the present embodiment, the keep time, during which the elevated priority state for the predetermined transmission object data is maintained, is measured, and, the readjustment process uses the above-described keep time as a readjustment parameter in addition to using the importance level. Assuming that, while the transmission object data with a relatively-short keep time has not yet been sufficiently collected by the external device 7, and that the transmission object data with a relatively-long keep time has already been sufficiently collected by the external device 7, the readjustment process in the present embodiment changes, e.g., extends, the data acquisition interval of the transmission object data with the long keep time for the adjustment of the data amount. In such manner, the present embodiment limits and/or prevents an excessive amount of data communication by keeping the amount of transmission data to be within the maximum capacity (e.g., of the buffer size), without lowering the sampling rate of the diagnostic data for analysis by the external device 7.

Third Embodiment

Hereafter, the third embodiment of the present disclosure is described with reference to FIGS. 1 and 8. In the third embodiment, the readjustment process is different from the first embodiment and the second embodiment. Since the configuration of the third embodiment is the same as the first embodiment, the following description describes elements and features previously described in the description of the first embodiment, and uses like references characters for the features and elements described with reference to FIG. 1 and other drawings.

In the present embodiment, with reference to FIG. 1, the transmission data generator 6 weights the transmission object data according to the priority set by the priority setter 5. That is, the transmission data generator 6 assigns a weight to the transmission object data based on the priority set by the priority setter 5. In addition to the above-described importance level as a readjustment parameter, the transmission data generator 6 may also use the above-described weighting as a readjustment parameter for the readjustment process. With reference to the processes performed by the transmission data generator 6 shown in FIG. 3, the process shown in FIG. 3 may be modified to include an additional step for a weighting process performed by the transmission data generator 6, for example, after the transmission data generator 6 obtains the priority at S201.

With reference to FIG. 8, an example of the readjustment process in the present embodiment is described. When the priority of each of the sensors A, B, C and D is elevated, the data acquisition interval for obtaining the transmission object data from the corresponding sensors A, B, C and D is changed to "250 ms." As a result, as shown in an upper part of FIG. 8, the size of the transmission object data corresponding to the sensors A, B, C and D is each set to "8 bytes," i.e., each having four pieces of 2 byte data, and the entire data length is "36 bytes." In such case, since the entire data length exceeds the maximum capacity (i.e., the maximum buffer capacity), the transmission data generator 6 first performs readjustment process using the importance level as a readjustment parameter.

In the readjustment process using the importance level, the data acquisition interval of the transmission object data corresponding to the sensor E with the lowest importance is changed to "1000 ms." As a result, as shown in a middle part of FIG. 8, the size of the transmission object data corresponding to the sensor E is reduced to "2 bytes." However, at this point, the entire data length is "34 bytes," and still exceeds the reserved capacity of 30 bytes. Thus, the transmission data generator 6 may perform the readjustment process using the weighting as a readjustment parameter.

In such a case, the transmission data generator 6 performs the weighting so that the weight of the sensors A to D having the elevated priority is raised relative to the weight of the sensor E that does not have the elevated priority, for example, setting the weight as "2:1." Such weighting reflects the amount of transmission object data stored in the transmission buffer, that is, reflects a stored "number" of transmission object data stored in the buffer. Here, taking such weighting into consideration, as shown in the following equations (1) and (2), the stored number of the transmission object data is determined, so that the entire data length fits within the maximum capacity. Note that N1 represents the stored number of the transmission object data corresponding to the sensors A to D, and N2 represents the stored number of the transmission object data corresponding to the sensor E.

$$N1=(30\ bytes \times 2)/(2+2+2+2+1) \approx 6\ bytes \quad \text{Equation (1)}$$

$$N2=(30\ bytes \times 1)/(2+2+2+2+1) \approx 3\ bytes \quad \text{Equation (2)}$$

Generally, both equations (1) and (2) show that the stored number of transmission object data is equal to the maximum capacity multiplied by the weight of the transmission object data divided by the sum of the transmission object weights. For example, N1=(30 bytes×weight of transmission object data for sensor A "2")/(weight of A "2"+weight of B "2"+weight of C "2"+weight of D "2"+weight of E "1"), which in this example is approximately 6 bytes.

According to the stored number determined in such manner, the transmission data generator 6 may change the data acquisition interval of each of the transmission object data. That is, while the transmission data generator 6 may change the data acquisition interval of the transmission object data corresponding to the sensors A to D to "333 ms," the data acquisition interval of the transmission object data corresponding to the sensor E may be changed to "666 ms."

As a result, as shown in a lower part of FIG. 8, while the size of the transmission object data corresponding to the sensors A to D is set as "6 bytes," e.g., three pieces of two byte data for each of the transmission object data corresponding to the sensors A to D, the size of the transmission object data corresponding to the sensor E is set as "3 bytes," e.g., one piece of two byte data for the transmission object data corresponding to the sensor E, and the entire data length is "26 bytes," by the readjustment process performed by the transmission data generator 6 based on the weighting. In other words, as a result of the readjustment process based on the weighting, the entire data length is within the limit of reserved capacity of 30 bytes. As such, the readjustment process ends.

With reference to the readjustment process performed by the transmission data generator 6 in FIG. 3 at S205, the process may be slightly modified. For example, the transmission data generator 6 may perform the readjustment process based on the importance level and weighting as one process, while in another example, the transmission data generator 6 may perform the readjustment process piecewise, that is, performing the readjustment based on importance level first and then performing the readjustment based on the weighted priority. As such, the processes at S203 and S205 in FIG. 3 may be repeated as needed to reduce an entire data length to or below the maximum capacity.

As described above, in the present embodiment, the transmission data generator 6 performs weighting for the transmission object data according to the priority. Further, in addition to using the importance level in the readjustment process, the above-described weighting is used as a readjustment parameter for the readjustment process. More practically, in the readjustment process of the present embodiment, the greater the weighting of the transmission object data is, the larger the stored number of the data in the transmission buffer (i.e., the transmission buffer is adjusted to store a larger number of pieces of a certain transmission object data), and the smaller the weighting of the transmission object data is, the smaller the stored number of the data in the transmission buffer (i.e., is adjusted to store less). The readjustment process performed in such manner is capable of limiting and/or preventing an excessive data communication amount, e.g., by reducing the amount of transmission data to be within the maximum capacity, without lowering the sampling rate of the diagnostic data that is used for the analysis by the external device 7, and the like.

Other Embodiments

The present disclosure is not limited to the above-described embodiments, which are described with reference to the drawings, but may be further modifiable. For example, one or more embodiments may be combined, either in part, or as a whole, with other embodiments described herein.

The numerical values given for each of the above-described embodiments are merely exemplary and non-limiting.

The timing at which the adjustment process is performed may be changed to any timing, so long as such timing does not interfere with the transmission cycle.

The adjustment process may not be limited to the above-described processes for adjusting the data capacity by adjusting the update frequency of the transmission object data based on the priority, but may also include processes for performing a data adjustment amount.

The setting condition of the priority may not only be set for individual vehicle data, but may also be set, for example, for a plurality of interrelated vehicle data.

In the second embodiment, the keep time is used as a readjustment parameter used in the readjustment process, in addition to the importance level. However, the importance level may be replaced with the keep time. In other words, the keep time may be used as a readjustment parameter without the additional use of the importance level as a readjustment parameter.

In the third embodiment, the weighting is used as a readjustment parameter used in the readjustment process, in addition to the importance level. However, the importance level may be replaced with the weighting. That is, the weighting may be used as a readjustment parameter without the additional use of the importance level as a readjustment parameter.

Although the present disclosure has been fully described in connection with embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An electronic control unit (ECU) disposed in a vehicle, the ECU comprising:
   an input section configured to input vehicle data from vehicle sensors and actuators as transmission object data;
   a transmission data generator configured to transmit the transmission object data to an external device as transmission data, the transmission object data being data determined from among the vehicle data as a transmission object;

a priority setter configured to set a priority of the transmission object data based on priority setting data included in the vehicle data, wherein the transmission data generator is further configured to perform an adjustment process that adjusts an amount of transmission data that is transmitted by the transmission data generator based on the priority set by the priority setter, wherein the transmission data generator is further configured to perform the adjustment process for every transmission cycle of the transmission data.

2. The electronic control unit of claim 1, wherein when the data amount after performing the adjustment process exceeds a maximum capacity that is set according to a capacity of a transmission buffer provided in the transmission data generator, the transmission data generator is further configured to perform a readjustment process that adjusts the data amount based on the priority and a readjustment parameter.

3. The electronic control unit of claim 2, wherein an importance level indicating an importance of the vehicle data is assigned to the vehicle data, and wherein the transmission data generator is further configured to use the importance level as the readjustment parameter while performing the readjustment process.

4. The electronic control unit of claim 2, wherein when the priority of a part of the transmission object data is elevated, the priority setter is further configured to measure a priority keep time during which a priority elevated state is maintained, and wherein the transmission data generator is further configured to use the priority keep time as the readjustment parameter while performing the readjustment process.

5. The electronic control unit of claim 2, wherein the transmission data generator is further configured to use a weight to weight the transmission object data according to the priority, and wherein the transmission data generator is further configured to use the weight as the readjustment parameter while performing the readjustment process.

6. An electronic control unit (ECU) disposed in a vehicle, the ECU comprising:

an input section configured to input vehicle data from vehicle sensors and actuators as transmission object data;

a transmission data generator configured to transmit the transmission object data to an external device as transmission data, the transmission object data being data determined from among the vehicle data as a transmission object;

a priority setter configured to set a priority of the transmission object data based on priority setting data included in the vehicle data, wherein the transmission data generator is further configured to perform an adjustment process that adjusts an amount of transmission data that is transmitted by the transmission data generator based on the priority set by the priority setter, wherein the adjustment process adjusts the data amount by a priority-based adjustment of an update frequency of the transmission object data.

7. The electronic control unit of claim 6, wherein when the data amount after performing the adjustment process exceeds a maximum capacity that is set according to a capacity of a transmission buffer provided in the transmission data generator, the transmission data generator is further configured to perform a readjustment process that adjusts the data amount based on the priority and a readjustment parameter.

8. The electronic control unit of claim 7, wherein an importance level indicating an importance of the vehicle data is assigned to the vehicle data, and wherein the transmission data generator is further configured to use the importance level as the readjustment parameter while performing the readjustment process.

9. The electronic control unit of claim 7, wherein when the priority of a part of the transmission object data is elevated, the priority setter is further configured to measure a priority keep time during which a priority elevated state is maintained, and wherein the transmission data generator is further configured to use the priority keep time as the readjustment parameter while performing the readjustment process.

10. The electronic control unit of claim 7, wherein the transmission data generator is further configured to use a weight to weight the transmission object data according to the priority, and wherein the transmission data generator is further configured to use the weight as the readjustment parameter while performing the readjustment process.

11. An electronic control unit (ECU) disposed in a vehicle, the ECU comprising:

an input section configured to input vehicle data from vehicle sensors and actuators as transmission object data;

a transmission data generator configured to transmit the transmission object data to an external device as transmission data, the transmission object data being data determined from among the vehicle data as a transmission object;

a priority setter configured to set a priority of the transmission object data based on priority setting data included in the vehicle data, wherein the transmission data generator is further configured to perform an adjustment process that adjusts an amount of transmission data that is transmitted by the transmission data generator based on the priority set by the priority setter, wherein at least one of
the vehicle data, and
a preset priority saved in the priority setter,
includes a setting condition for the vehicle data for a setting of the priority by the priority setter.

12. The electronic control unit of claim 11, wherein when the data amount after performing the adjustment process exceeds a maximum capacity that is set according to a capacity of a transmission buffer provided in the transmission data generator, the transmission data generator is further configured to perform a readjustment process that adjusts the data amount based on the priority and a readjustment parameter.

13. The electronic control unit of claim 12, wherein an importance level indicating an importance of the vehicle data is assigned to the vehicle data, and wherein the transmission data generator is further configured to use the importance level as the readjustment parameter while performing the readjustment process.

14. The electronic control unit of claim 12, wherein when the priority of a part of the transmission object data is elevated, the priority setter is further configured to measure a priority keep time during which a priority elevated state is maintained, and wherein the transmission data generator is further configured to use the priority keep time as the readjustment parameter while performing the readjustment process.

15. The electronic control unit of claim 12, wherein the transmission data generator is further configured to use a weight to weight the transmission object data according to the priority, and wherein the transmission data generator is further configured to use the weight as the readjustment parameter while performing the readjustment process.

* * * * *